(12) United States Patent
Binici et al.

(10) Patent No.: US 12,724,799 B1
(45) Date of Patent: Sep. 1, 2026

(54) PRESERVING TABULAR DATA INTEGRITY FOR QUERY PROCESSING SYSTEM

(71) Applicant: SAP SE, Walldorf (DE)

(72) Inventors: Kuluhan Binici, Singapore (SG); Wei Liang Lim, London (GB); Hu Soon Tan, Singapore (SG); Zhen Shu, Singapore (SG); Gopal Jhunjhunwala, Hyderabad (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/217,627

(22) Filed: May 23, 2025

(51) Int. Cl.

| | |
|---|---|
| ***G06F 16/31*** | (2019.01) |
| ***G06F 16/334*** | (2025.01) |
| ***G06F 16/338*** | (2019.01) |

(52) U.S. Cl.
CPC ........ *G06F 16/328* (2019.01); *G06F 16/3347* (2019.01); *G06F 16/338* (2019.01)

(58) Field of Classification Search
None
See application file for complete search history.

(56) References Cited

U.S. PATENT DOCUMENTS 12,437,155 B1 * 10/2025 Zhang .................. G06F 40/143
12,547,634 B1 * 2/2026 Vouitsis ........... G06F 16/24578

* cited by examiner

*Primary Examiner* — Eddy Cheung
(74) *Attorney, Agent, or Firm* — Sterne, Kessler, Goldstein & Fox P.L.L.C.

(57) ABSTRACT

System, method, and various embodiments for a tabular data integrity and query processing system are described herein. An embodiment operates by receiving a query to be executed against a knowledgebase. One or more keywords are identified from the query, and a vector search is performed against the knowledgebase based on the one or more keywords, the knowledgebase including documents that have been divided into a plurality of chunks. A subset of chunks related to generating an answer for the query are identified based on the vector search, the subset including a first chunk with a table ID. A table image corresponding to the table ID is identified. A prompt is generated instructing a language model to generate the answer to the query based on the subset of chunks, including the first chunk and the table image. The answer is provided.

20 Claims, 6 Drawing Sheets

PRESERVING TABULAR DATA INTEGRITY FOR QUERY PROCESSING SYSTEM

BACKGROUND

The retrieval and processing of tabular data embedded in documents presents significant challenges in maintaining data integrity and usability of those documents, particularly with regards to the tabular data. When tabular data is embedded as an image this may prevent text-based readers from accurately parsing the tabular data. This can become especially problematic during a document-chunking process used to create knowledge bases. In document-chunking the tabular data may be split into multiple parts causing it to lose contextual coherence, rendering parts of the tabular data uninterpretable or unusable, thereby affecting the accuracy and reliability of any results generated based on the tabular data or even any portion or chunk of the document.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a tabular data integrity and query processing system.

The retrieval and processing of tabular data embedded in documents presents significant challenges in maintaining data integrity and usability of those documents, particularly with regards to the tabular data. When tabular data is embedded as an image this may prevent text-based readers from accurately parsing the tabular data. This can become especially problematic during a document-chunking process used to create knowledge bases. In document-chunking, the tabular data may be split into multiple parts causing it to lose contextual coherence, rendering parts of the tabular data uninterpretable or unusable, thereby affecting the accuracy and reliability of any results generated based on the tabular data or even any portion or chunk of the document.

Figure 1:
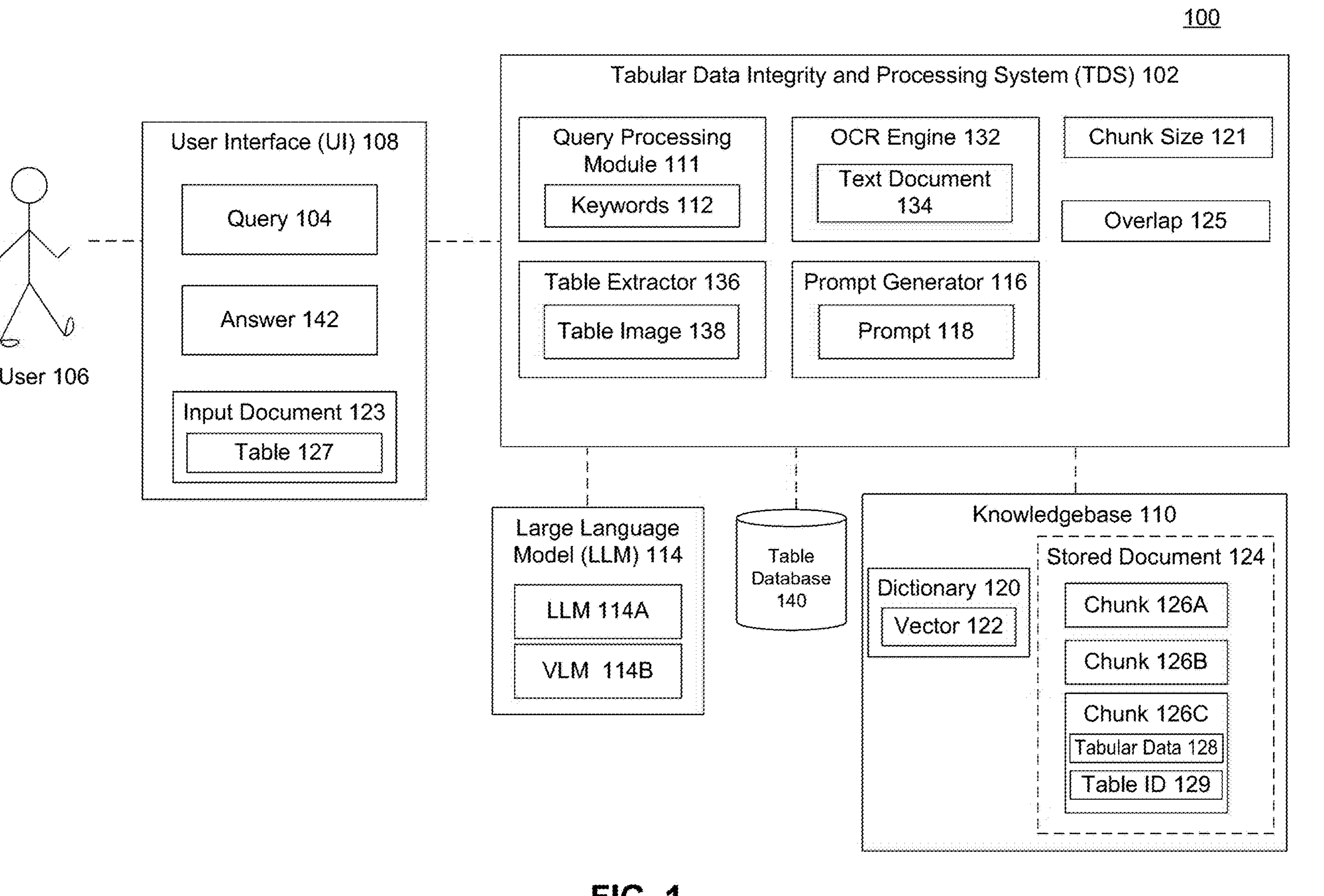
FIG. 1 is a block diagram illustrating example functionality for a tabular data integrity and query processing system (TDS), according to some embodiments.

FIG. 1 is a block diagram 100 illustrating example functionality for a tabular data integrity and query processing system (TDS) 102, according to some embodiments. TDS 102 may preserve the integrity of the data stored in a table 127 of an input document 123 while facilitating its efficient parsing, storage, retrieval, and integration into and for automated systems. TDS 102 may seamlessly stitch fragmented tabular data 128 (from a table 127) together preserving its completeness and ensuring that the tabular data 128 remains usable during storage, retrieval, and query processing.

In some embodiments, TDS 102 may implement a dedicated auxiliary database, such as a table database 140, for storing extracted table images 138 from input documents 123, which may provide a solution that guarantees that tabular data 128 remains intact and interpretable (during query processing or while performing other data processing tasks) when the input document 123 is segmented into smaller chunks 126A-C. This approach prevents the structural disintegration of tables 127 and tabular data 128 often caused by chunking, ensuring that the data of a table 127 retains its contextual coherence and can be accurately retrieved when needed, thus providing for both efficient data processing of the retrieved data, and more accurate query 104 processing and answer generation.

A problem arises when the header of the table 127 is separated from any portion of the records into a different chunk 126. If this happens, the tabular data 128 stored in the subsequent chunk 126 may not be understandable to an LM 114. For example, there would be no way to tell what the data was in the chunk without the header information. Thus resulting in wasted processing resources in analyzing the partial data, and which may also result in producing a wrong or inaccurate answer based on the partial tabular data. TDS 102 may address this problem. In some embodiments, the approach employed by TDS 102 may chunk an input document 123 in such a way that the headers of a table are placed together in the same chunk 126A-C as the records or rows of a table, ensuring that all of the tabular data 128 is stored together and may be used in query or other data processing.

In some embodiments, TDS 102 may receive an input document 123 to be stored as part of knowledgebase 110. The input document 123 may be received from any person or system, including but not limited to user 106. In some embodiments, the user 106 may submit both a query 104 and a corresponding input document 123 against which to process the query 104 to TDS 102 through a user interface (UI) 108.

Knowledgebase 110 may include a storage mechanism (operable across one or more devices) where various data, images, documents, or other content is stored. In some embodiments, the content stored in knowledgebase 110 may be used to be submitted to a language model (LM) 114 to generate an answer, generate new content from the data of knowledgebase 110, or be used as part of processing a query 104.

In some embodiments, to optimize both storage and query processing, long input documents 123 may be divided into a plurality of chunks 126A-C (referred to herein generally as chunk 126 or chunks 126). In some embodiments, each chunk 126 may be stored and processed individually, as a standalone document. The chunks 126 may include sections or smaller pieces or divisions of the input document 123 which is stored in knowledgebase 110 as stored document 124. Stored document 124 may include any document, file, or files that are stored in knowledgebase 110, including images and other multimedia files.

In some embodiments, the process of storing an input document 123 into knowledgebase 110 may include using a table extractor 136 to determine whether the input document 123 includes any tables 127. In some embodiments, the table 127 may be embedded as an image in the input document 123. In some embodiments, the entire input document 123 may itself be an image or an otherwise uneditable document, such as a portable document format (PDF) document. A PDF document may any combinations of text and/or images.

In some embodiments, table extractor 136 may be configured to determine whether or not the input document 123 includes a table 127. For example, table extractor 136 may be configured to identify any images within input document 123 visually arranged in a table structure. A table 127 may include any information, content, or data that is organized into a spreadsheet or table structure including any number of headers, columns and rows or records. In some embodiments, table extractor 136 may capture or extract a table image 138 if a table 127 is identified in input document 123, or return a null set, empty set, or other indicator if no table 127 is identified in input document 123.

In some embodiments, TDS 102 may use an OCR engine 132 to convert or extract text from images (e.g., input document 123 which may be an image, and/or a table image 138 as extracted from input document 123). By using OCR engine 132, TDS 102 may enable the efficient and accurate parsing of tables 127 embedded as images in an input document 123. In some embodiments, by focusing OCR engine 132 specifically on the identified or extracted table image 138, or areas of input document 123 identified as a table 127 or tabular data 128, TDS 102 minimizes computational overhead and avoids parsing errors that may occur in non-tabular sections of the input document 123, thereby achieving a balanced trade-off of scalability and answer quality.

In some embodiments, OCR engine 132 may generate text document 134 which may be a text version of the input document 123. In some embodiments, OCR engine 132 may be configured to analyze an image and identify the text within the image, and convert the image it into a machine-readable format like text or JSON (Javascript Object Notation) as text document 134. For input documents 123 which have been received as text, the OCR processing of the input (text) document 123 may be skipped and no text document 134 may be generated. However, a text version of the table image 138 (e.g., tabular data 128) may still be generated using OCR engine 132 if the input document 123 includes a table 127. In some embodiments, the OCR engine 132 may include a PDF text parser which is configured to convert a PDF document into a text document 134 without OCR.

As noted above, documents that are to be stored in knowledgebase 110 may be separated into smaller section, subsections, or chunks 126, which may provide for more efficient data processing. For example, an input document 123 may be a long document containing content about different subjects, not all of which may be relevant when answering a particular query. Thus, only focusing on analyzing those chunks 126 related to a query 104 both increases the speed of processing and produces more accurate answers 142.

For example, input document 123 may be a prospectus for a company that includes portions such as: management team, company overview, past sales, projected sales, client profiles, growth strategy, etc. If a user 106 asks a question about the past sales of the company, the portion of the document about the management team may be irrelevant. Separating the prospectus into different chunks 126 ensures that only the relevant chunks 126 of the document are processed, and irrelevant chunks 126 of the document are not processed as part of the query processing, thereby saving processing resources, while also increasing system throughput and improving answer quality.

In some embodiments, TDS 102 may include a chunk size 121. Chunk size 121 may indicate a standard size or maximum size for a chunk 126. In some embodiments, the chunk size 121 may indicate a maximum number of characters (e.g., alphanumeric and/or symbolic characters) allowed in each chunk 126.

If the text document 134 is less than the chunk size 121, the text document 134 may be stored in the knowledgebase 110 without being divided into chunks 126.

In some embodiments, if there is no table 127 identified in the input document 123, and the text document 134 is greater than chunk size 121, then the text document 134 may be separated or divided into chunks 126 (less than or equal to chunk size 121) and stored in the knowledgebase 110 without the table processing described herein, other than an initial table check by table extractor 136.

Figure 2:
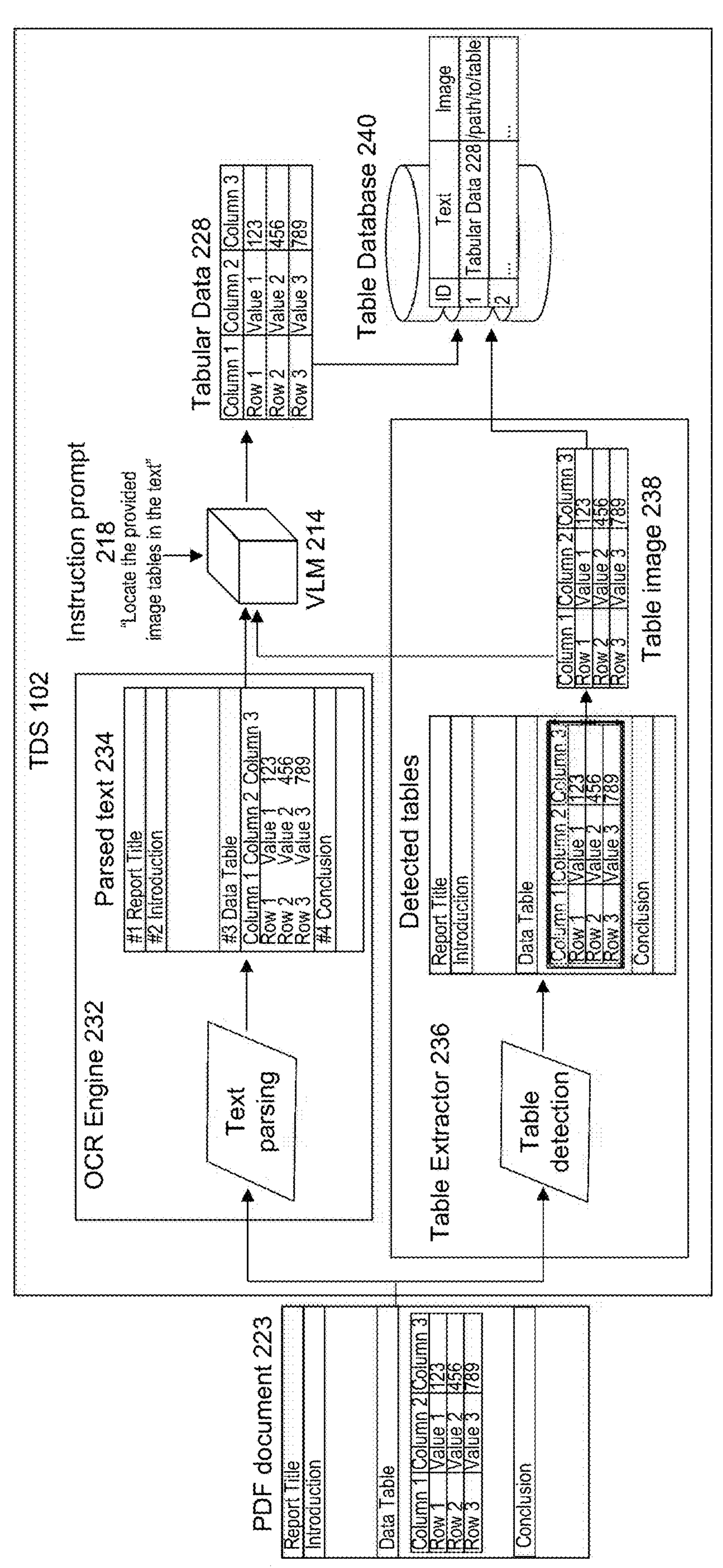
FIG. 2 is a block diagram illustrating example operations for extracting tabular data from an input document, as performed by the tabular data integrity and query processing system (TDS), according to some embodiments.

In some embodiments, if table extractor 136 identifies a table 127 or returns a table position and/or table image 138, then TDS 102 may perform the processing described with respect to FIG. 2, though which the table image 138 and tabular data 128 corresponding to the table 127 may be extracted from input document 123.

FIG. 2 is a block diagram 200 illustrating example operations for extracting tabular data 228 from an input document 223, as performed by the tabular data integrity and query processing system (TDS) 102, according to some embodiments.

In some embodiments, TDS 102 may receive an input document in the form of a PDF document 223. As illustrated the PDF document 223 may include different portions, including a data table. Though illustrated as blank boxes for simplicity, it is understood that PDF document 223 may include additional alphanumeric/symbolic text throughout the document, across the various sections.

As noted above, PDF document 223 may be converted to text by an OCR engine 232 (e.g., as noted above which may be or include a PDF text parser) prior to storage in knowledgebase 110. As illustrated, a copy of the PDF document 223 may be provided to OCR engine 232 to generate parsed text 234 corresponding to the PDF document 223, which may include parsing the table from image format into text format as performed by the table extractor 236. One the problems that often arises with OCR processing of a table image is that the text conversion process may skew the alignment of the table and/or make the data of the table difficult, or impossible to read or process. This is one the problems addressed by TDS 102 processing of documents with tables as described herein.

In some embodiments, a copy of the PDF document 223 may also be provided to a table extractor 236 (which may be an example of the table extractor 136 described with respect to FIG. 1). In some embodiments, table extractor 236 may include a specialized deep learning-based detection model configured to identify table images in an image or other document. In some embodiments, table extractor 136 may visually identify tables and provide, return, or identify the pixel coordinates of the rectangular bounding boxes that enclose the table. These bounding boxes may be used by TDS 102 or table extractor 136 to locate and crop the table image 238 (which may be an example of table image 138 as described with respect to FIG. 1) corresponding to the identified table(s) from the PDF document 223.

In some embodiments, the OCR engine 232 and table extractor 236 may operate simultaneously, each with its own copy of the PDF document 223.

In some embodiments, prompt generator 116 (as described with respect to FIG. 1), may generate an instruction prompt 218 instructing a visual language model (VLM) 214, to locate the provided table image 238 inside the parsed text 234. VLM 214 may be configured to identify text similar to the table image 238 within the parsed text 234, and extract the portion of the parsed text document 234 corresponding to the table image 238. In some embodiments, VLM 214 may generate and insert a table ID inside of text document 234 corresponding to the table image 238. In some embodiments, the table ID may replace the tabular data within the text document 234, until after chunking is performed. This process is described in greater detail below with respect to FIG. 3. In some embodiments, one or more prompts 118, as described herein may be received from a user 106 and may be used in lieu and/or in addition to the prompts 118 generated by prompt generator 116.

The result of the VLM 214 processing may be that the tabular data 228 corresponding to the table image 238 has been extracted, and may be stored in table database 240. As illustrated, for each table identified in the PDF document 223, a table identifier may be generated, along with the corresponding tabular data 228, and a path where the table image 238 is stored.

Figure 3:
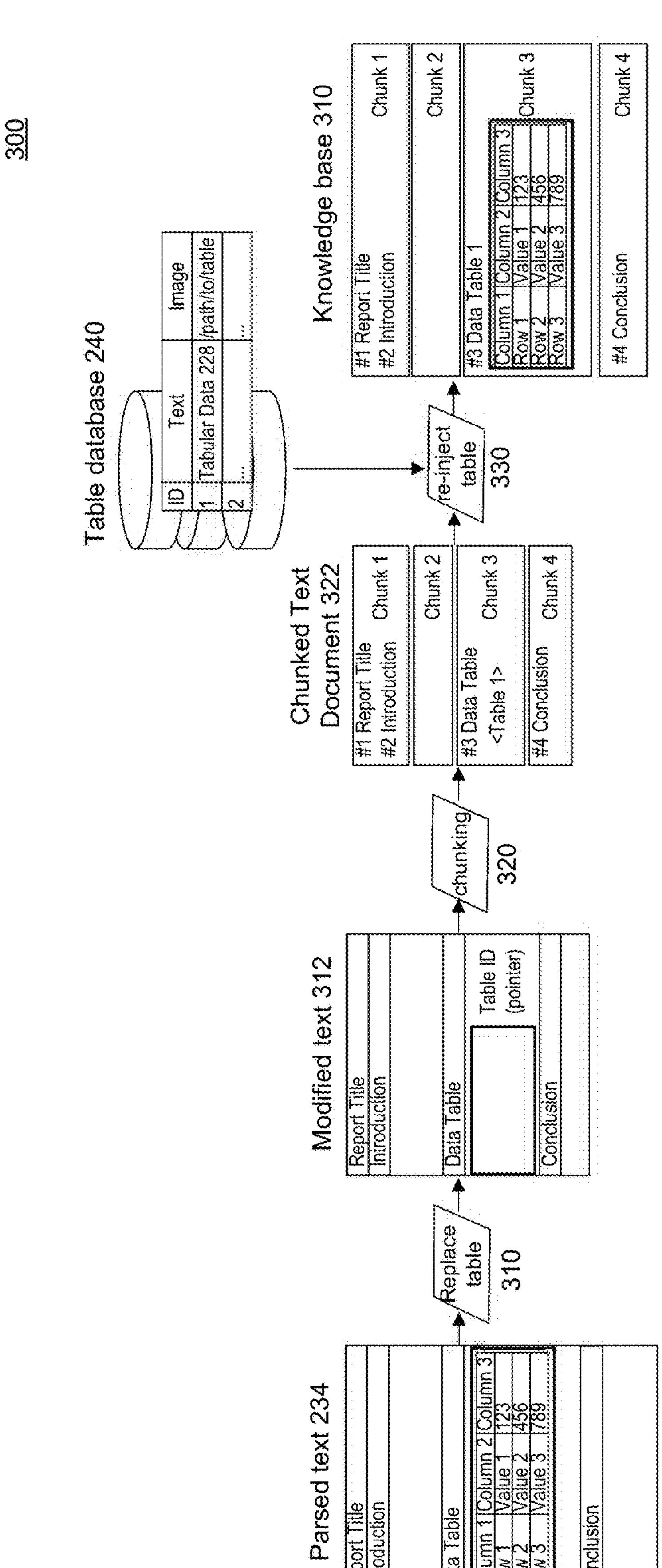
FIG. 3 illustrates example operations related to chunking a document that includes tabular data, according to some embodiments.

FIG. 3 illustrates example operations related to chunking a document that includes tabular data, according to some embodiments. As noted above, one of the challenges with conventional techniques is that table data is often separated into different chunks, thus making the tabular data incomplete or impossible to process. TDS 102 processes documents to ensure that tabular data is stored together in a single chunk.

As noted above, to associate extracted tables with their locations in the parsed text 234, both the parsed text 234 and its corresponding table image 238 counterpart are passed to a VLM 214.

At 310, the VLM 214 may identify the positions of the table image 238 within the parsed text 234. If a table was already parsed by the OCR engine 232, the tabular data 228 (corresponding to the table image 238) may be replaced with a pointer or table ID that links to its location in the table database 240, as illustrated in the modified text document 312.

In some embodiments, for tables embedded as images that were initially undetectable, the table ID may be placed at the positions identified by the VLM 214. The text tables or tabular data 228 identified by the VLM 214 are then paired with their table image counterparts. In some embodiments, for this, first the table images may be sorted according to their bounding box coordinates provided by the table extractor 236, then they may be sequentially matched with the text tables in the order they appear in the PDF document 223. Once the pairing is done, tables on the parsed text 234 are replaced with table IDs, as illustrated in modified text 312.

At 320 modified text document 312 may be divided or split into chunks. The chunking of the modified text document 312 including the table ID (in lieu of the tabular data 228) may ensure that the table ID appears in a singular chunk 126.

In some embodiments, TDS 102 may include an overlap 125 (as illustrated in FIG. 1). The overlap 125 may include a specific number of characters that are included in two sequential chunks 126. If overlap 125 is 100 characters, then the last 100 characters of chunk 126A may be identical to the first 100 characters of chunk 126B, and the last 100 characters of chunk 126B may be identical to the first 100 characters of chunk 126C, etc.

Returning to FIG. 3, in the edge case where the table ID appears near the end of a chunk 126 and is split between two different chunks, the overlap 125 would ensure that the entire table ID appears on at least one chunk.

At 330, after the chunking is complete, the tabular data 228 may be re-injected to the chunks (corresponding to examples of chunks 126) according to the table IDs, while keeping the table IDs to preserve the links to the image counterparts. In this approach, TDS 102 may identify that chunk 3 includes table 1 ID.

TDS 102 may retrieve the text for this table (e.g., tabular data 228) from table database 240 and insert this text before or after the table ID. In some embodiments, the table ID may be maintained in the chunk 326C. Table ID may be maintained because this may be beneficial during processing if the tabular data 228 is skewed, difficult or impossible to read. When processing this chunk 326C, an LLM or VLM may have access to the original table image from the table database 240, corresponding to the table 1 ID. This approach ensures that the integrity of the tables do not get impacted by the chunking process. The modified chunks are then hashed using text encoders to construct the knowledge base.

If the table ID appears in an overlap 125 portion, on both a first chunk and a second chunk, then default processing may be to ignore or delete the second appearance of the table ID, and only include the table text in the first chunk. In other embodiments, the table text may be duplicated on both the first chunk and second chunk in the manner described above. In some embodiments, reinserting the tabular data 228 into a chunk may cause the size of the chunk with the tabular data 228 to exceed the specified chunk size 121, however this exception to the chunk size 121 may be allowed by TDS 102 to preserve the integrity of the data of a table 127.

Returning to FIG. 1, in some embodiments, TDS 102 may receive a query 104 from a user 106 through a user interface (UI) 108. The query 104 may include any command, request, or inquiry from the user 106 for which an answer can be generated based on the information stored in a knowledgebase 110. The knowledgebase 110 may include one or more stored documents 124 which may be stored as chunks 126A-C. In some embodiments, the chunks 126A-C may be stored separately, with different network addresses or even across different computing devices or servers.

UI 108 may include any application front-end or graphical user interface designed to interact with a user 106. In some embodiments, UI 108 may include a chatbot configured to interact with user 106. The UI 108 may be displayed on the screen of any computing device (e.g., mobile device, tablet computer, laptop, or other device connected to a display or monitor).

In some embodiments, a query processing module 111 may identify one or more keywords 112 related to the query 104. In some embodiments, the query processing module 111 may either do keyword extraction on the user queries 104 for keyword-based retrieval, or it may use a deep learning-based sentence encoder model to produce numeric vectors that encode the semantic information of the query for vector similarity-based retrieval.

The keywords 112 may include any words, phrases, text, or any other alphanumeric string of characters. The keywords 112 may correspond to search criteria or vectors that will executed against the knowledgebase 110 to identify any information or data relevant to answering the query 104. An example query 104 may be "from which state did we receive the highest sales revenue?", and example keywords 112 may be: state, sales revenue.

In some embodiments, query processing module 111 may leverage a language model (LM) 114 to identify the keywords 112 from query 104. LM 114 may include an artificial intelligence, machine learning, or deep learning model that is configured to execute data processing commands from plain-text (e.g., not requiring computer language or coded input). LM 114 may be configured to create original content from one or more documents or input in accordance with a prompt. In some embodiments, LM 114 may include a generative pre-training transformer (GPT).

For simplicity, only a single LM 114 is illustrated, however it is understood that LM 114 may any number of different language models that may be utilized by TDS 102, including a large language model (LLM) 114A and/or a visual language model (VLM) 114B (an example of which is also described as VLM 214). As used herein, LM 114 may be used to refer to and LLM 114A and/or VLM 114B generally, which may share many operational attributes except that LLM 114A may be specialized for language processing tasks, while VLM 114B may be specialized for visual or image processing tasks.

In some embodiments, LLM 114A may include any language model or computing system that is configured to perform processing tasks based on text-based or plain language inputs.

VLM 114B may include an artificial intelligence, machine learning, or deep learning model that is configured to execute data processing commands from plain-text (e.g., not requiring computer language or coded input) on some video or other visual input. VLM 114B may be an example of a multimodal large language model (LLM). VLM 114B may include any computing system that is configured to perform processing tasks based on visual inputs, in accordance with text-based or plain language instructions organized as prompts 118 generated by a prompt generator 116 or received from a user 106. VLM 214, as described herein, is an example of VLM 114B.

In some embodiments, VLM 114B may be configured to create original content from the visual input, extract portions of the visual input as output, and/or respond to queries or perform other processing with regard to the visual input in accordance with a prompt 118. In some embodiments, VLM 114B may be configured to read alphanumeric text from an image and respond to a query or instruction accordingly.

A prompt 118 may include one or more lines of text organized across one or more documents that is particularly formatted to by understandable by either LLM 114A or VLM 114B. For simplicity, only a single prompt 118 is illustrated, however it is understood that prompt generator 116 may be configured to generate any number of prompts 118. In some embodiments, TDS 102 may include a first prompt generator 116 configured to generate prompts for LLM 114A, and a second prompt generator 116 configured to generate prompts for VLM 114B. A prompt 118 may also include some sort of language input (for LLM 114A) or visual input (for VLM 114B) upon which some processing is to be performed in accordance with the instructions of the prompt 118.

In some embodiments, prompt generator 116 may generate a prompt 118 to instruct LLM 114A to identify a set of one or more keywords 112 from the query 104. In some embodiments, the input with the keyword prompt 118 may be the query 104, from which the LLM 114 may independently decide what are the keywords 112 from the query 104. In some embodiments, the keywords 112 may comprise subjects and/or objects identified in the query 104.

In some embodiments, knowledgebase 110 may include a dictionary 120. In some embodiments, dictionary 120 may include a list of vectors 122 that describe the type of information documents or chunks stored in the knowledgebase 110.

In some embodiments, when an input document 123 is separated into chunks 126 and stored in knowledgebase 110, prompt generator 116 may generate a vector prompt 118 for LLM 114A. The vector prompt 118 may be used to request LLM 114A to generate a set of keywords or vectors 122 relevant to each chunk 126, which may be stored as metadata with the chunk 126 and/or in dictionary 120.

For example, input document 123 may include a long document with lots of different information, across different subjects, all of which may not be applicable a single query 104. Rather than applying the same vector 122 to each chunk 126, TDS 102 may perform chunk-by-chunk analysis on the relevant keywords or vectors for each chunk 126. Thereby allowing for irrelevant chunks 126 may be excluded from query processing.

For example, the input document 123 may be a prospectus with a company overview [0059] section, a historical sales section, a management team section, a projected revenue section, and a products section. A query 104 asking about who the CEO is, would not require all the different chunks 126 of the prospectus. To submit the entire prospectus to the LLM 114A or to use the same vectors 122 across all the different chunks 126 would consume additional bandwidth and processing sources, which may result in a less accurate answers and slower answer being produced.

In some embodiments, the dictionary 120 may be submitted with a keyword prompt 118 (along with query 104) to identify the keywords 112. For example, vectors 122 may include the phrases: "taxes", "gross pay", "net pay", and "pay stub", and query 104 may be "how much did I pay in taxes on my last paycheck?". LLM 114 may identify both taxes and pay stub as keywords 112.

In some embodiments, after the keywords 112 have been identified, TDS 102 may perform or command knowledgebase 110 to perform a vector search to identify the relevant chunks 126 across various stored documents 124 which may be useful in generating an answer to the query 104. In some embodiments, the vector search may include performing a Cosine similar search between the various vectors 122 associated with each chunk 126 (across different stored documents 124) and returning only the most similar chunks 126. In other embodiments, different similarity searches may be performed other than Cosine similarity.

In some embodiments, in addition to or in lieu of the text-based vector search described above, a vector 122 may be a numeric or alphanumeric vectors containing numbers and/or letters that encode semantic information about the associated text in a representation that is understandable by machine learning models.

Upon receiving the most relevant chunks 126, prompt generator 116 may generate an answer prompt 118 to cause LLM 114A to generate a result or answer 142. With or as part of the answer prompt 118 may include the original query 104 and the relevant chunks 126 identified from knowledgebase 110. In some embodiments, answer prompt 118 may restrict LLM 114A to only using the returned chunk 126 in generating the result 142. In some embodiments, the answer prompt 118 may cause LLM 114A to primarily rely on the provided chunks 126 in generating answer 142.

In some embodiments, if chunk 126C is returned to TDS 102 as being relevant to processing query 104, then TDS 102 may retrieve the table image 138 corresponding to the table ID 129 from the table database 140. In some embodiments, TDS 102 may provide the table image 138 with the chunk 126C to the LLM 114A as part of answer prompt 118. In this way, if there is any ambiguity or skewing of the tabular data 128, LLM 114A may refer to the table image 138 to resolve any data skewing or ambiguities that may exist in chunk 126C, thus providing for more accurate results 142.

Figure 4:
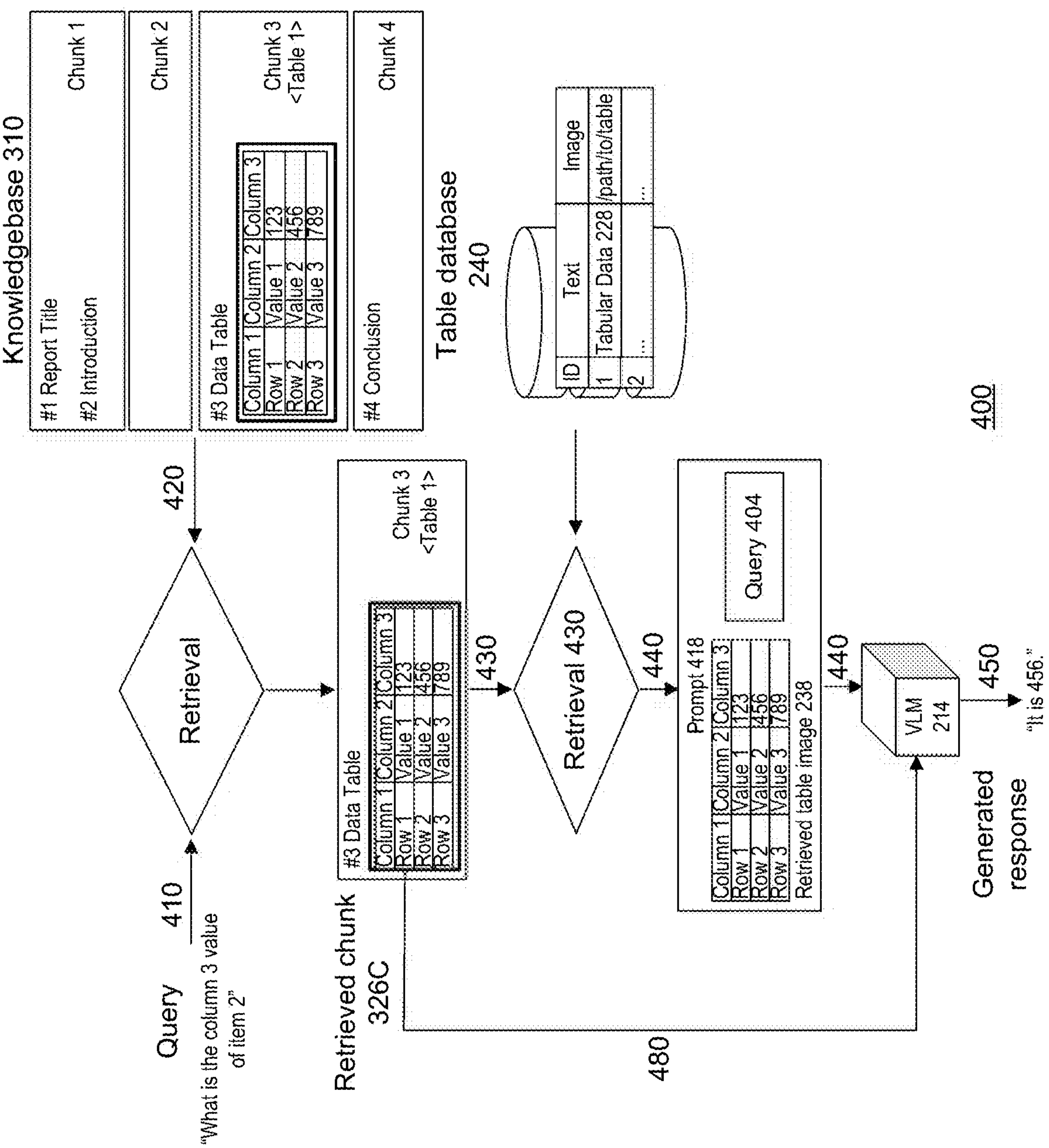
FIG. 4 is a block diagram illustrating example operations for processing a query, as performed by the tabular data integrity and query processing system (TDS), according to some embodiments.

FIG. 4 is a block diagram 400 illustrating example operations for processing a query, as performed by the tabular data integrity and query processing system (TDS) 102, according to some embodiments.

At 410, a query is received from a user. As illustrated, the query may be for a specific value from a table from a document (column 3, value of item 2). At 420, the corresponding chunk, including the table referred to the in the query, may be retrieved from the knowledgebase 310.

When a user query 104 is received and a document chunk 126 is retrieved from the knowledgebase 310, TDS 102 may check for pointers within the chunks that link to tables stored in the table database 240. If a pointer is found, the associated table image 138 is retrieved as supplementary context. This enriched context is then supplied to the VLM 214, which generates contextually relevant response to the query 104.

As illustrated, the chunk 3 (including the table) may include a table ID: Table 1. At 430 the corresponding table image 238 (corresponding to Table 1 ID) may be retrieved from the table database 240. Then, at 440 a prompt 418 include the retrieved table image 238 and the query 404 may be provided to the VLM 214, along with the retrieved chunk 326C. The VLM 214 may process the query 404 and generate and return a result at 450.

Figure 5:
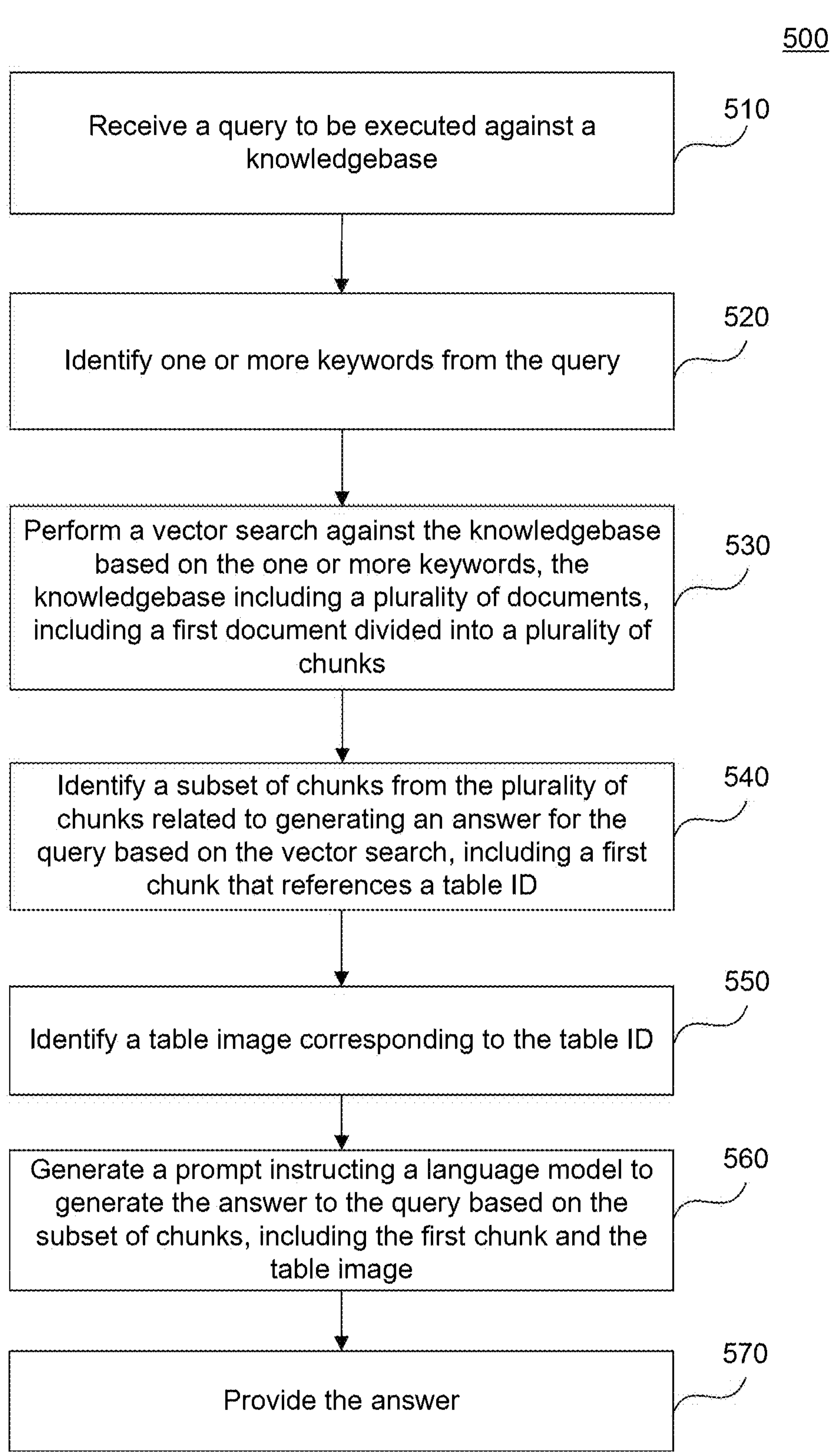
FIG. 5 is a flowchart illustrating example operations for providing a tabular data integrity and query processing system (TDS), according to some embodiments.

FIG. 5 is a flowchart 500 illustrating example operations for providing a tabular data integrity and query processing system (TDS) 102, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIG. 1.

In 510, a query to be executed against a knowledgebase is received. For example, UI 108 may receive a query 104 from a user 106, the query 104 to be executed against knowledgebase 110.

In 520, one or more keywords are identified from the query. For example, prompt generator 116 may generate a keyword prompt 118 for LLM 114A to identify keywords 112 from the query 104 corresponding to the relevant words or subject matter of the query 104.

In 530, a vector search is performed against the knowledgebase based on the one or more keywords. For example, TDS 102 may perform a vector search or cause knowledgebase 110 to perform a vector search based on the keywords 112. In some embodiments, the vector search may be similarity search identifying the vectors 122 from a dictionary 120 or other storage of metadata that are most similar to the keywords 112. Each vector 122 may correspond to a chunk 126 of any number of stored documents 124 which may have divided and stored in knowledgebase 110.

In 540, a subset of chunks from the plurality of chunks related to generating an answer for the query based on the vector search, includes a first chunk that references a table ID. For example, knowledgebase 110 may return one or more chunks 126 that correspond to the vectors identified in the vector search, including a chunk 126C which may include a reference to a table ID 129, and which may also include tabular data 128 (e.g., a text version of a table 127).

In 550, a table image corresponding to the table ID is identified, wherein the table image was included in the first document prior to being divided into the plurality of chunks, and wherein the table image is stored separately from the first chunk. For example, In 560, a prompt is generated instructing a language model to generate the answer to the query based on the subset of chunks, including the first chunk and the table. For example, prompt generator 116 may generate an answer prompt 118 instructing LLM 114A or VLM 114B to generate an answer 142 based on the subset of one or more chunks 126 identified as being relevant to the keywords 112 of the query 104.

In 570, the answer is provided. For example, TDS 102 may return the answer 142 to the user 106 via the UI 108.

Figure 6:
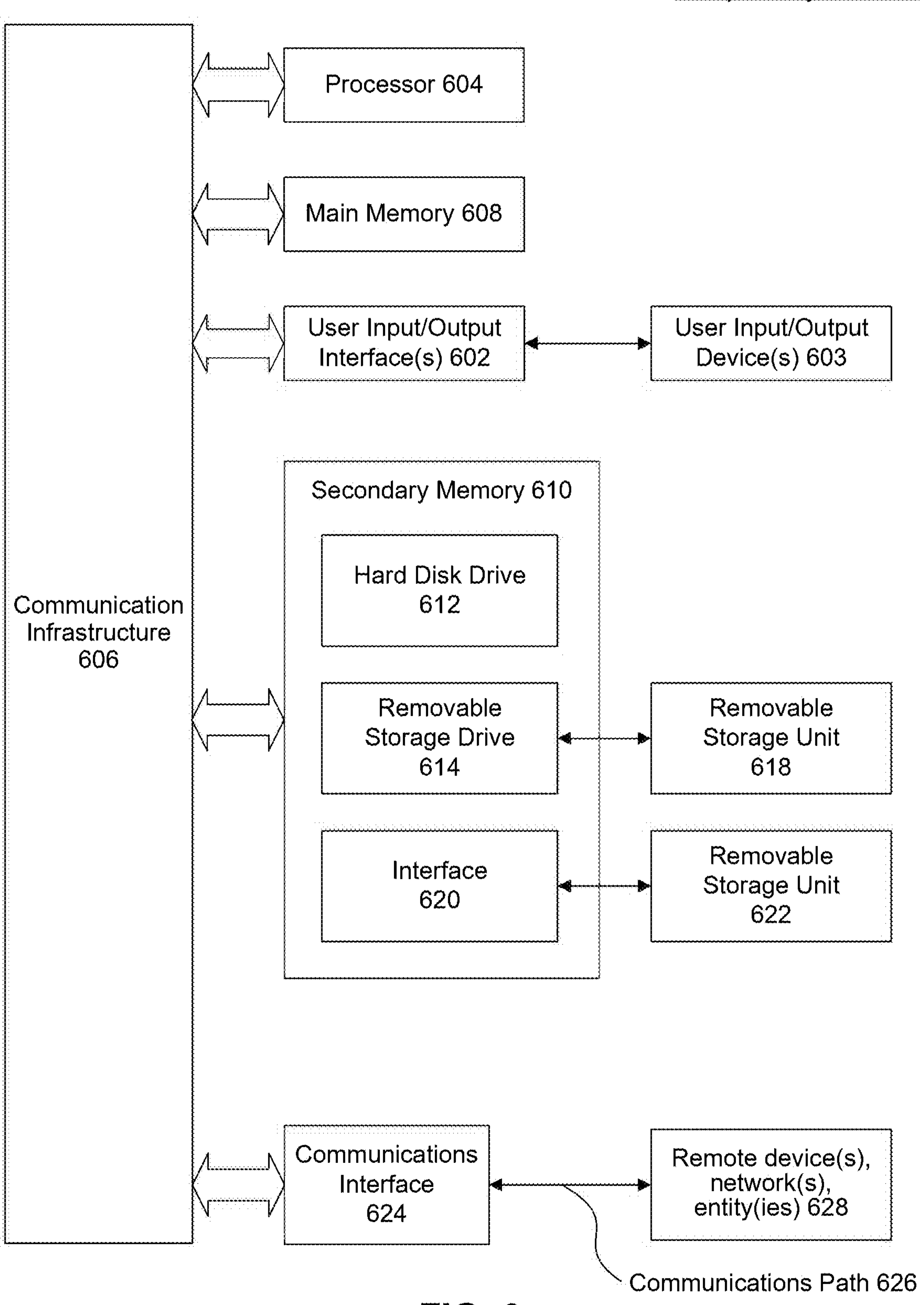
FIG. 6 is example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:

receiving a query to be executed against a knowledgebase;

identifying one or more keywords from the query;

performing a vector search against the knowledgebase based on the one or more keywords, wherein the knowledgebase comprises a plurality of documents, and wherein a first document of the plurality of documents has been divided into a plurality of chunks and stored in the knowledgebase;

identifying a subset of chunks from the plurality of chunks related to generating an answer for the query based on the vector search, wherein the subset of chunks includes a first chunk, and wherein the first chunk comprises a table ID corresponding to a table;

identifying a table image corresponding to the table ID, wherein the table image was included in the first document prior to being divided into the plurality of chunks, and wherein the table image is stored separately from the first chunk;

generating a prompt for a language model to generate the answer to the query based on the subset of chunks, including the first chunk and the table image; and providing the answer, generated by the language model based on the subset of chunks, responsive to the receiving the query.

2. The computer-implemented method of claim 1, wherein the first chunk includes a text version of the table.

3. The computer-implemented method of claim 1, wherein the first document is divided into the plurality of chunks based on a threshold character length for each of the plurality of chunks.

4. The computer-implemented method of claim 3, wherein there is an overlap between a subset of characters stored across two consecutive chunks.

5. The computer-implemented method of claim 3, further comprising:

identifying the table in the first chunk prior to dividing the first document into the plurality of chunks;

capturing the table image of the table; and inserting the table ID into a portion of the first document adjacent to where the table was identified.

6. The computer-implemented method of claim 5, wherein the inserting comprises replacing the table with the table ID.

7. The computer-implemented method of claim 6, further comprising:

dividing the first document, wherein the table ID has replaced the table, into the plurality of chunks; and inserting the table into the portion of the first chunk adjacent to the table ID.

8. The computer-implemented method of claim 7, wherein the first chunk includes both a text version of the table and the table ID.

9. The computer-implemented method of claim 5, wherein the image of the table is stored in a storage location with the table ID and a text version of the table.

10. A system comprising:

a memory; and at least one processor coupled to the memory and configured to perform operations comprising:

receiving a query to be executed against a knowledgebase;

identifying one or more keywords from the query;

performing a vector search against the knowledgebase based on the one or more keywords, wherein the knowledgebase comprises a plurality of documents, and wherein a first document of the plurality of documents has been divided into a plurality of chunks and stored in the knowledgebase;

identifying a subset of chunks from the plurality of chunks related to generating an answer for the query based on the vector search, wherein the subset of chunks includes a first chunk, and wherein the first chunk comprises a table ID corresponding to a table;

identifying a table image corresponding to the table ID, wherein the table image was included in the first document prior to being divided into the plurality of chunks, and wherein the table image is stored separately from the first chunk;

generating a prompt for a language model to generate the answer to the query based on the subset of chunks, including the first chunk and the table image; and providing the answer, generated by the language model based on the subset of chunks, responsive to the receiving the query.

11. The system of claim 10, wherein the first chunk includes a text version of the table.

12. The system of claim 10, wherein the first document is divided into the plurality of chunks based on a threshold character length for each of the plurality of chunks.

13. The system of claim 12, wherein there is an overlap between a subset of characters stored across two consecutive chunks.

14. The system of claim 12, the operations further comprising:

identifying the table in the first chunk prior to dividing the first document into the plurality of chunks;

capturing the table image of the table; and inserting the table ID into a portion of the first document adjacent to where the table was identified.

15. The system of claim 14, wherein the inserting comprises replacing the table with the table ID.

16. The system of claim 15, the operations further comprising:

dividing the first document, wherein the table ID has replaced the table, into the plurality of chunks; and inserting the table into the portion of the first chunk adjacent to the table ID.

17. The system of claim 16, wherein the first chunk includes both a text version of the table and the table ID.

18. The system of claim 14, wherein the image of the table is stored in a storage location with the table ID and a text version of the table.

19. A non-transitory computer-readable medium having instructions stored thereon that, when executed by at least one computing device, cause the at least one computing device to perform operations comprising:

receiving a query to be executed against a knowledgebase;

identifying one or more keywords from the query;

performing a vector search against the knowledgebase based on the one or more keywords, wherein the knowledgebase comprises a plurality of documents, and wherein a first document of the plurality of documents has been divided into a plurality of chunks and stored in the knowledgebase;

identifying a subset of chunks from the plurality of chunks related to generating an answer for the query based on the vector search, wherein the subset of chunks includes a first chunk, and wherein the first chunk comprises a table ID corresponding to a table;

identifying a table image corresponding to the table ID, wherein the table image was included in the first document prior to being divided into the plurality of chunks, and wherein the table image is stored separately from the first chunk;

generating a prompt for a language model to generate the answer to the query based on the subset of chunks, including the first chunk and the table image; and providing the answer, generated by the language model based on the subset of chunks, responsive to the receiving the query.

20. The non-transitory computer-readable medium of claim 19, wherein the first chunk includes a text version of the table.

* * * * *